A. G. DAY.
TREATMENT OF CRUDE CAOUTCHOUC.
No. 757. Reissued July 12, 1859.
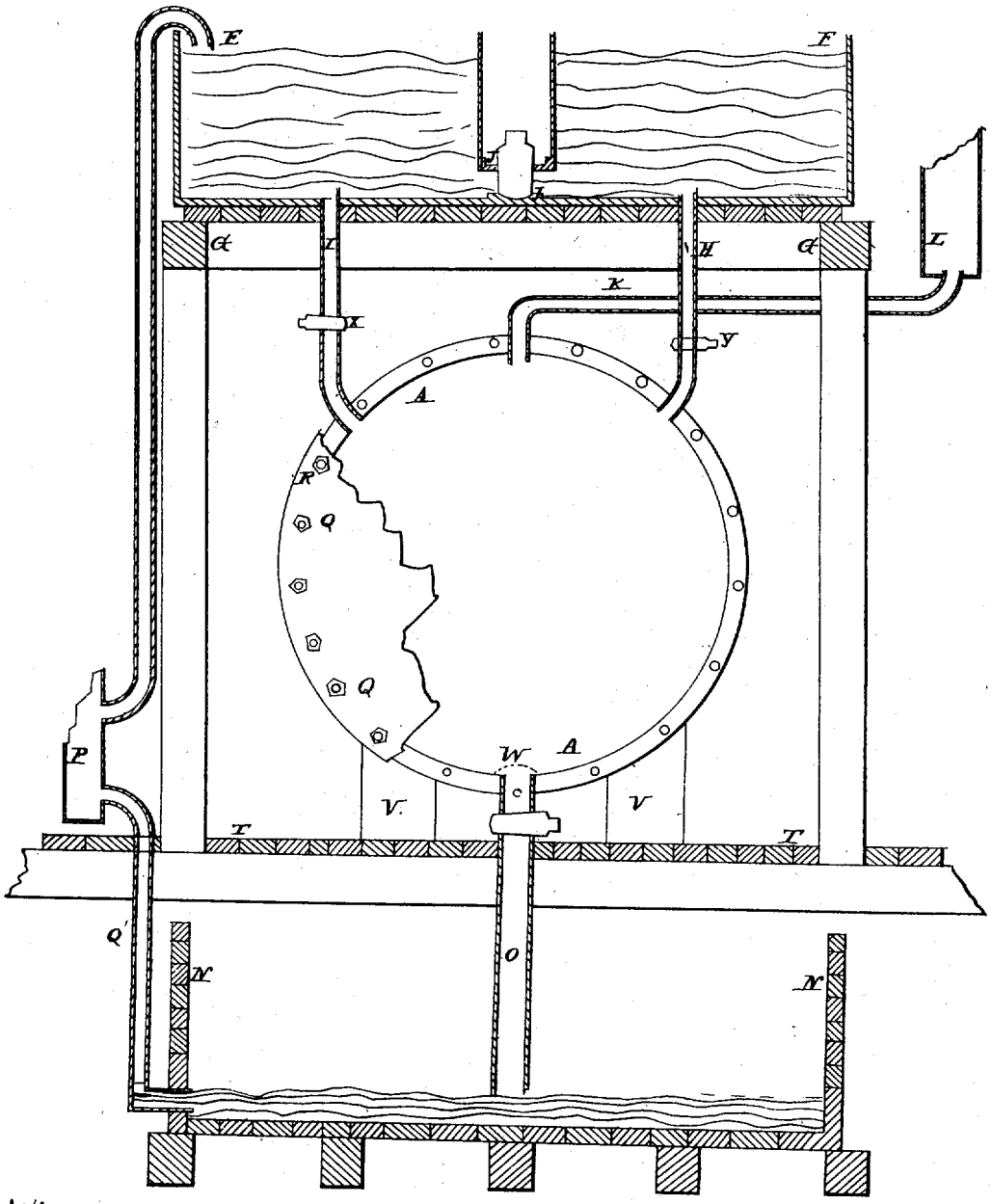
Witnesses:
Jas. Brown
Thos Rowley
Inventor:
Austin G. Day

UNITED STATES PATENT OFFICE.

AUSTIN G. DAY, OF SEYMOUR, CONNECTICUT.

IMPROVEMENT IN TREATMENT OF CRUDE CAOUTCHOUC.

Specification forming part of Letters Patent No. 15,067, dated June 10, 1856; Reissue No. 737, dated July 12, 1859.

*To all whom it may concern:*

Be it known that I, AUSTIN G. DAY, of the town of Seymour, county of New Haven, and State of Connecticut, have invented a new and improved method of charging the pores of crude caoutchouc, or commercial rubber, with alkaline or other equivalent liquid for the purpose of aiding in cleaning said article from the various impurities which it contains; and I do hereby declare that the following is a full and exact description thereof, reference being had to the accompanying drawings, and to the letters of reference marked thereon.

The nature of this invention consists in the use of a peculiar apparatus for more effectually charging the crude gum or other equivalent substance with alkaline or other liquid used in separating impurities therefrom.

The apparatus consists of a horizontal cylinder, generally of iron, arranged with an iron tank above it and another of equal capacity underneath it, the former to contain liquid for charging the cylinder after it is filled with the comminuted crude caoutchouc, and the latter for receiving the spent liquid drawn off from the iron cylinder after it has been used for penetrating the pores of the caoutchouc.

In the drawings, A represents the cylinder, made of boiler-iron, and of suitable size to contain the quantity of caoutchouc or other gum that may be worked at a single operation, and of such strength as may enable it to bear any pressure to which it may be exposed by being exhausted, or by forcing in air or liquid in amount equal to two or more atmospheres. The cylinder is supported in the horizontal position on the floor T, from which it is raised about one foot by means of the blocks U. A drain-pipe, O, having a strainer at W, leads through the floor T to the vat or cistern N. Above the said cylinder, and supported upon the platform G, are two cisterns, E and F, connected with each other by the horizontal pipe J. From these cisterns the pipes H and I lead to cylinder A. An air-pump at L, of suitable size, is connected with the top of the cylinder A by means of pipe K.

In the vat or cistern N, beneath the floor, as already shown, there is a pump, P, for which the supply-pipe Q′ furnishes the means of discharging the alkaline or equivalent liquor from cistern N to cisterns F and E. In the vat or cistern N is put the alkaline or other liquid used for charging the pores of the gum, consisting of caustic or carbonated alkali, or other similar liquid that will at once water-soak the bark and sticks and cleanse crude gum by means of exhausting and compressing the cylinder, as hereinafter described, the present invention being confined to the construction and operation of the exhausting apparatus.

The solution of carbonate of soda or potash having been prepared of the strength of about 20° Baumé, is put into the upper cisterns, F and E, in sufficient quantity to fill the iron cylinder, calculated beforehand, and the stop-cocks *x* and *y* being closed, the crude caoutchouc, previously comminuted by twice running through the toothed cylinders, is fed into the cylinder A in suitable quantities for convenient working. Thus a cylinder seven feet long by forty-two inches diameter, internal measurement, will work from twelve hundred to fifteen hundred pounds at a charge. The movable head Q of the cylinder is put in its place and secured by means of the keys and bolts R. The air-pump at L is then put in order for working, and the air exhausted from the cylinder A, and then the alkaline liquid allowed to run down through *x* and *y* and fill the cylinder, and enter the pores and cavities of the crude gum and water-soak and otherwise act upon and dissolve to some extent the foreign bodies contained therein, thus rendering the foreign bodies specifically heavier than water, while the caoutchouc is lighter.

In most cases simply exhausting the cylinder and then letting on the pressure of the atmosphere will answer all the purpose required; but in some cases it has been found necessary to put on an extra pressure of one or two atmospheres. This is generally done by attaching an ordinary forcing-pump to the cylinder, (not shown in the drawings,) and by it force in more liquid till the pressure-gage indicates the amount of an extra atmosphere. The liquid is allowed to remain in contact with the caoutchouc ordinarily from fifteen to twenty minutes, sometimes thirty minutes. Pipe O is then opened, and the liquor descends into cistern N, while the caoutchouc is removed to a fresh cistern of water and thoroughly rinsed and washed. After the gum has been suitably washed it is in a fit state to be transferred to toothed rollers arranged with a suitable slipping movement, well known to manufacturers of rubber goods, (when applied to plain rollers.) These rollers, working in contact with water, finish the washing of the gum and separate the last portions of alkali, and leave the rubber in the form of broad corrugated sheets, fit for drying and seasoning.

What I claim as my invention in the present application, and desire to secure by Letters Patent, is—

Charging the caoutchouc or other like gum with alkaline liquor or its equivalent by means of the exhausting apparatus herein described and represented.

AUSTIN G. DAY.

Witnesses:

WM. RAYNOR,

ALLAN RUTHERFORD.